(12) United States Patent
Fang

(10) Patent No.: US 10,135,824 B2
(45) Date of Patent: Nov. 20, 2018

(54) METHOD AND SYSTEM FOR DETERMINING WHETHER A TERMINAL LOGGING INTO A WEBSITE IS A MOBILE TERMINAL

(71) Applicant: Alibaba Group Holding Limited, George Town (KY)

(72) Inventor: Tengfei Fang, Hangzhou (CN)

(73) Assignee: Alibaba Group Holding Limited (KY)

(*) Notice: Subject to any disclaimer, the term of this patent is extended or adjusted under 35 U.S.C. 154(b) by 0 days.

(21) Appl. No.: 14/589,869

(22) Filed: Jan. 5, 2015

(65) Prior Publication Data
US 2015/0195268 A1 Jul. 9, 2015

(30) Foreign Application Priority Data
Jan. 7, 2014 (CN) .......................... 2014 1 0007143

(51) Int. Cl.
*H04L 29/06* (2006.01)
*H04L 9/32* (2006.01)

(52) U.S. Cl.
CPC ........ *H04L 63/0876* (2013.01); *H04L 9/3213* (2013.01); *H04L 63/08* (2013.01); *H04L 63/0807* (2013.01)

(58) Field of Classification Search
CPC . H04L 63/08; H04L 63/0807; H04L 63/0876; H04L 9/3213
See application file for complete search history.

(56) References Cited

U.S. PATENT DOCUMENTS

| 7,137,006 | B1* | 11/2006 | Grandcolas ............. G06F 21/41 713/180 |
| 7,340,525 | B1 | 3/2008 | Bhatia et al. |
| 8,613,069 | B1 | 12/2013 | Martini |
| 8,935,607 | B2 | 1/2015 | Zhu |
| 2005/0216846 | A1 | 9/2005 | Kalenius |
| 2007/0180367 | A1 | 8/2007 | Chiang |
| 2007/0288841 | A1 | 12/2007 | Rohrabaugh et al. |

(Continued)

FOREIGN PATENT DOCUMENTS

| CN | 101977233 | 2/2011 |
| CN | 102238007 | 11/2011 |

(Continued)

*Primary Examiner* — Catherine Thiaw
*Assistant Examiner* — Wayne An
(74) *Attorney, Agent, or Firm* — Van Pelt, Yi & James LLP

(57) ABSTRACT

Embodiments of the present application relate to a method and system for determining whether a terminal logging into a website is a mobile terminal. The method includes receiving a login request to access a website from a terminal, generating a first token, sending information including a redirect script to the terminal, the redirect script configured to cause the terminal to execute the redirect script and to access an activation link, receiving a verification request from the terminal, determining whether the version of the first token included in the verification request is valid relative to the generated first token, sending an indication that the first token is valid to the terminal, receiving an access request, the access request including the second token, determining whether the second token is valid, and determining whether the terminal is a mobile terminal according to whether the second token is valid.

25 Claims, 9 Drawing Sheets

(56) References Cited

U.S. PATENT DOCUMENTS

| | | | |
|---|---|---|---|
| 2011/0138171 A1* | 6/2011 | Yildiz | H04L 67/306 |
| | | | 713/153 |
| 2013/0152009 A1 | 6/2013 | Caliendo et al. | |
| 2013/0262467 A1 | 10/2013 | Zhang et al. | |
| 2015/0067472 A1* | 3/2015 | Chen | G06F 17/30905 |
| | | | 715/234 |

FOREIGN PATENT DOCUMENTS

| | | |
|---|---|---|
| CN | 103024740 | 4/2013 |
| EP | 1422907 | 5/2004 |
| JP | H11184818 | 7/1999 |
| KR | 101323816 | 10/2013 |
| WO | WO2013049392 A1 | 4/2013 |

* cited by examiner

METHOD AND SYSTEM FOR DETERMINING WHETHER A TERMINAL LOGGING INTO A WEBSITE IS A MOBILE TERMINAL

CROSS REFERENCE TO OTHER APPLICATIONS

This application claims priority to People's Republic of China Patent Application No. 201410007143.5 entitled A METHOD AND A SERVER FOR DETERMINING WHETHER A TERMINAL LOGGING INTO A WEBSITE IS A MOBILE TERMINAL, filed Jan. 7, 2014 which is incorporated herein by reference for all purposes.

FIELD OF THE INVENTION

The present application relates to a method, an apparatus, and a system for determining whether a terminal logging into a website is a mobile terminal.

BACKGROUND OF THE INVENTION

Wireless websites are websites developed for mobile terminals and Internet websites accessed via mobile terminals (e.g., cell phones, tablet computers, and/or the like). Although a user may access a wireless website using many different types of devices such as a personal computer (PC), a mobile terminal, and/or the like, using mobile terminals to access wireless websites may provide users with better user experiences. Wireless websites may provide many of the same functions as ordinary websites. For example, a wireless website can realize the great majority of the functions of a corresponding ordinary website. However wireless websites are primarily developed for the consumption of users that use a mobile terminal. Wireless websites solve many of the restrictions associated with ordinary websites, and thus enable users to access the wireless websites and acquire information from a variety of locations and at the users' convenience. Accordingly, wireless websites increase user work efficiency and increase the value of information.

According to the related art, some wireless websites have high security requirements (e.g., to provide a user with a secure interaction therewith). For example, some wireless websites with high security requirements may only permit users to log in thereto using mobile terminals and do not permit users to log in using terminals that are not mobile terminals (e.g., PCs such as desktop computers and notebook computers, and/or the like). In other words, some wireless websites having high security requirements may only provide access to users using mobile terminals. Access to wireless websites (e.g., log in to the wireless websites) may be restricted to mobile terminals and access from terminals other than mobile terminals may be prevented because the mechanism for providing a mobile terminal with secure access to a wireless website may be incompatible with terminals other than mobile terminals. For example, when a user logs into a website having higher security requirements using a terminal other than a mobile terminal (e.g., a PC, and/or the like), the website typically requires the user to first install a security control so that the user's account number and password can be encrypted through the installed security control when the user logs into the website. The use of the security control and encryption of the user's account number and password prevents account numbers and passwords from being compromised (e.g., kidnapped) by a malicious module (e.g., a Trojan horse program, a virus, and/or the like). However, such a security control cannot be installed on a mobile terminal. Therefore, the security mechanisms associated with a wireless website and a normal website differ, and generally such security mechanisms will not be set up for wireless websites. Thus, a malicious module (e.g., a Trojan horse program, a virus, malicious software, and/or the like) may compromise security information (e.g., a username, a password, and/or the like) if a terminal other than the mobile terminal (e.g., a PC, and/or the like) attempts to log in to a wireless website. Therefore, in order to prevent security information from being compromised by a malicious module, wireless websites having higher security requirements will be configured to prevent access thereto by terminals other than mobile terminals (e.g., to prevent users from logging into the wireless website using a PC and/or the like).

According to the related art, a type of terminal accessing a particular wireless website may be determined. For example, a wireless website server (e.g., a server hosting the wireless website, or the like) may determine whether a terminal accessing a wireless website is a mobile terminal. In order to determine whether the terminal accessing the wireless website is a mobile terminal, the wireless website server may use user agent information (e.g., user agent information included in a user-agent string of an HTTP Request) communicated in connection with access to the wireless website. For example, the wireless website server may identify (e.g., determine) the user agent information included in the http protocol. The user agent information is a part of the http protocol. The user agent information may be used to acquire (e.g., determine) the equipment type and operating system of the terminal used to access the wireless website and thus to determine whether the user is accessing a website with a mobile terminal. However, a terminal that is not a mobile terminal may spoof as a mobile terminal using falsified user agent information. In other words, user agent information used when accessing a wireless website can be falsified (e.g., counterfeited). For example, false user agent information can be set up via a browser, and then a terminal (e.g., a PC or the like) pretending to be a mobile terminal can log into a wireless website.

BRIEF DESCRIPTION OF THE DRAWINGS

Various embodiments of the invention are disclosed in the following detailed description and the accompanying drawings.

The drawings described here are intended to further the understanding of the present application and form a part of this application. The illustrative embodiments of the present application and the descriptions thereof are intended to explain this application and do not constitute inappropriate limitation of the present application. Among the drawings.

DETAILED DESCRIPTION

Figure 1:
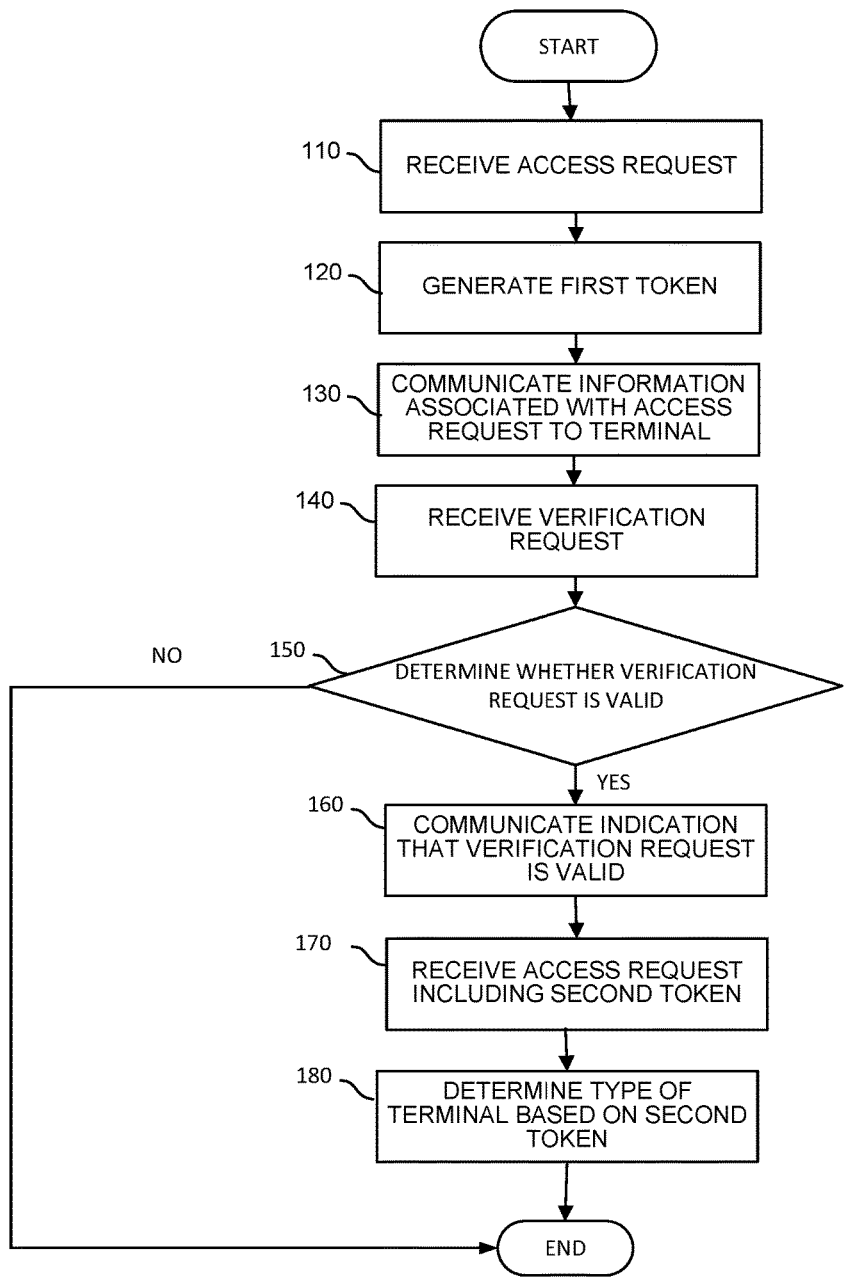
FIG. 1 is a flowchart of a method for determining whether a terminal accessing a website is a mobile terminal according to various embodiments of the present disclosure.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Various embodiments of the present disclosure include a method, an apparatus, and a system for verifying whether (or otherwise ensuring that) a terminal used to log into a website is a mobile terminal.

According to various embodiments of the present disclosure, one or more tokens are communicated between a terminal and a website server (e.g., a wireless website server) and at least one of the one or more tokens are validated to determine whether (or otherwise ensure) a terminal accessing the website is a mobile terminal. A first token may be generated (e.g., by the website server, or the like) and communicated to a terminal in response to the terminal logging into the website (e.g., using a browser). The terminal may use the first token to activate a client application on the terminal and a server (e.g., the website server) may validate the first token. For example, when a user logs into a website via a browser on a terminal, a first token is generated. The first token may cause the browser on the terminal, through a redirect mechanism, to access an activation link for activating a client application on the terminal, thus activating said client application and causing the client application to use the server to verify whether the first token is valid. In some embodiments, when the server generate the token, the token is stored in a buffer. Accordingly, if the terminal communicates an identical or copy of the token stored in the buffer of the server, then the terminal is determined to have sent a valid token. For example, a verification of whether a token is valid includes determining whether a received token is the same (e.g., identical to or a copy of) the token stored at the server (e.g., the token generated by the server). In some embodiments, the redirect mechanism is similar to a Google link for advertisements. Moreover, the terminal accesses the website again (e.g., the website is accessed through the browser on the terminal), and, in response to the terminal accessing the website again, the server determines whether the terminal is a mobile terminal by verifying whether a second token acquired in relation to an access request for accessing the website (e.g., the second token may be generated by the website server and communicated to the terminal in response to the terminal communicating an access request to the server) sent by the browser is valid. In some embodiments, the server determines whether the terminal is a mobile terminal by verifying whether a second token acquired in relation to an access request for accessing the website in response to the terminal attempting to log in to the website again. In some embodiments, the token is verified each time the terminal logs into the website.

According to various embodiments of the present application, a method, an apparatus, and/or a system is provided for determining whether a terminal accessing (e.g., logging into) a website is a mobile terminal.

A terminal generally refers to a device used (e.g., by a user) within a network system and used to communicate with one or more servers. According to various embodiments of the present disclosure, a terminal may include communication functionality. For example, a terminal may be a smart phone, a tablet Personal Computer (PC), a mobile phone, a video phone, an e-book reader, a desktop PC, a laptop PC, a netbook PC, a Personal Digital Assistant (PDA), a Portable Multimedia Player (PMP), an mp3 player, a mobile medical device, a camera, a wearable device (e.g., a Head-Mounted Device (HMD), electronic clothes, electronic braces, an electronic necklace, an electronic accessory, an electronic tattoo, or a smart watch), and/or the like.

According to various embodiments of the present disclosure, a terminal may be a smart home appliance with communication functionality. A smart home appliance may be, for example, a television, a Digital Video Disk (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, a terminal may be a medical device (e.g., Magnetic Resonance Angiography (MRA) device, a Magnetic Resonance Imaging (MRI) device, Computed Tomography (CT) device, an imaging device, or an ultrasonic device), a navigation device, a Global Positioning System (GPS) receiver, an Event Data Recorder (EDR), a Flight Data Recorder (FDR), an automotive infotainment device, a naval electronic device (e.g., naval navigation device, gyroscope, or compass), an avionic electronic device, a security device, an industrial or consumer robot, a piece of furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, a terminal may be any combination of the foregoing devices. In addition, it will be apparent to one having ordinary skill in the art that a terminal according to various embodiments of the present disclosure is not limited to the foregoing devices.

According to various embodiments of the present disclosure, a mobile terminal refers to a terminal device that can be used on the move. For example, a mobile terminal may be a cell phone, a tablet computer, and/or the like.

FIG. 1 is a flowchart of a method for determining whether a terminal accessing a website is a mobile terminal, according to various embodiments of the present disclosure.

Referring to FIG. 1, a method 100 for one or more servers, operating individually or in combination, to verify (e.g., determine) whether a terminal accessing (e.g., logging into) a website is a mobile terminal, is provided. In some embodiments, the method 100 may be implemented by a server such as a server 520 illustrated in FIG. 5.

At 110 an access request is received. In some embodiments, a server (e.g., a website server associated with a website) receives the access request. The server may receive the access request from a terminal attempting to access a website or otherwise attempting to log into the website. For example, in response to a user requesting a terminal to log into the website, the terminal may send an access request to a server associated with the website.

At 120, a first token and/or the like is generated. In some embodiments, the server generates a first token and/or the like. The server may save the first token on a storage device associated with the server. The server may generate the first token in response to receiving the access request (e.g., from the terminal). For example, in response to a user logging into a website via a browser on a terminal, a first token is generated and saved on the server. As an example, in response to a user entering the user's account number, password, and other login information (e.g., via a browser installed on a terminal) so as to log into a website, the terminal (e.g., the browser) sends a login request to the website server. The website server generates the first token upon receiving the login request from the terminal (e.g., sent via the browser on the terminal).

According to various embodiments of the present disclosure, the first token includes information that identifies the terminal and the access request. For example, in some embodiments, the first token includes an IP address of the terminal, a physical address (e.g., a MAC address) of the server, a timestamp (e.g., a timestamp for the generation of the first token), a serial number, and/or the like. In some embodiments, the first token is a unique token. For example, the server may associate a new serial number with a corresponding first token. Each time the server generates a first token, the server may increase a serial number by one (e.g., a serial number generator may increase a count of generated serial numbers by one for each serial number generated) and the serial number may be associated with the first token currently generated so as to ensure the uniqueness of the first token. In some embodiments, the first token may include information such as terminal time, terminal IP address, terminal MAC address, a sequence that automatically increments, the like, or any combination thereof in order to generate a unique identifier. For example, a unique identifier may be generated by the sum of a terminal time, a terminal IP address, a terminal MAC address, and a sequence that automatically increments. According to various embodiments of the present disclosure, the first token may have an expiration date or time, a period of time for which the first token remains valid, and/or the like. The first token may be saved on the server for a period of time (e.g., until the expiration date or time has passed, until the period of time for which the first token remains valid has expired, and/or the like). For example, the server may store the first token until this first token expires. According to various embodiments of the present disclosure, in response to expiration of the first token, the server may delete the first token therefrom.

At 130, information associated with the access request to the terminal is communicated. In some embodiments, the server communicates information associated with the access request to the terminal. For example, the server may send the first token to the terminal. As another example, the server may send a page (or link thereto) including a redirect script to the terminal (e.g., to the browser on the terminal). The information associated with the access request that is communicated to the terminal may cause the terminal to execute the redirect script (e.g., the server may communication information to the terminal that causes the browser to execute the redirect script).

In some embodiments, the terminal sends, to the server, the verification request in response to an activation link being accessed by the terminal. In response to the activation link being accessed by the terminal, a client application may be activated on the terminal.

According to various embodiments of the present disclosure, the redirect script is configured to cause the terminal (e.g., the browser on the terminal) to access an activation link that activates a client application on the terminal in order to activate the client application. In some embodiments, the redirect script includes an activation link. The client application may be any one of one or more client applications installed on the terminal. In some embodiments, the client application is an authentication application (e.g., that is used to authenticate whether the terminal is a mobile terminal). Specifically, the server may send a page to the terminal (e.g., to a browser of the terminal). The page sent to the terminal may include a redirect script (e.g., a JavaScript script, and/or the like). By executing the redirect script, the browser will carry out page redirection. For example, the script will carry out page redirection so as to access the activation link of the client application included in the redirect script and can thereupon activate the client application.

At 140, a verification request is received. In some embodiments, the server receives the verification request. For example, the server may receive the verification request from the terminal. The verification request may be sent by the client application on the terminal. In some embodiments, the verification request includes the first token that was received by the terminal from the server. For example, the verification request may include the first token acquired by the client application from the activation link.

In some embodiments, the client application is activated by the terminal (e.g., the browser on the terminal) executing the redirect script and thereafter accessing the activation link. According to various embodiments of the present disclosure, the activation link includes an access address of the website, the first token, and/or the like. The client application may acquire the access address of the website, the first token, and/or the like from the activation link and/or by accessing the activation link.

According to various embodiments of the present disclosure, in response to the terminal (e.g., the browser on the terminal) executing the redirect script and accessing the activation link, the client application is activated (e.g., woken up, and/or the like). In some embodiments, the client application acquires the access address of the website, the first token, and/or the like from the activation link and/or by accessing the activation link. The client application uses the access address as a basis for sending a verification request to the server requesting verification as to whether the first token is valid. In some embodiments, the terminal (e.g., the client application) generates the verification request in response to the client application being activated. The verification request may include a first token, and/or the like.

At 150, a determination of whether the verification request is valid is made. In some embodiments, the server determines whether the verification request is valid. For example, the server may validate the first token. According to various embodiments of the present disclosure, the server determines whether the first token included in the verification request is valid. Thereafter, a verification result (e.g., a result of the determination as to whether the first token included in the verification request is valid) is sent to the terminal (e.g., the client application).

According to various embodiments of the present disclosure, the server stores the first token for a period of time (e.g., until the expiration of the first token). In some embodiments, when the first token expires (e.g., in response to expiration of the first token), the server deletes the first token.

In some embodiments, the server determines whether the first token included in the verification request is valid by comparing the first token included in the verification request with the first token generated in response to the access request. For example, the server can be queried as to whether the server has (e.g., is storing) a first token that is identical to the first token included in the verification request. If the server has a first token that is identical to the first token included in the verification request, then the first token is determined to be valid.

If the verification request is determined not to be valid (e.g., if the first token included in the verification request is determined to not be valid) at 150, then the method for determining whether the terminal is a mobile terminal may end. For example, the server may determine that the terminal attempting to log into the website is not a mobile terminal.

In contrast, if the verification request is determined to be valid (e.g., if the first token included in the verification request is determined to be valid) at 150, then, at 160, the server may communicate an indication that the verification request is valid. For example, in response to the server determining that the first token included in the verification request is valid (e.g., matches the first token generated in response to the access request), the server may send an indication to the terminal that the verification request is valid.

According to various embodiments of the present disclosure, in response to receiving an indication that the verification request is valid (e.g., that the first token included in the verification request is valid), the terminal generates a second token. In some embodiments, the terminal (e.g., the client application) generates the second token by encrypting the first token. In some embodiments, the second token is an encrypted version of the first token. In some embodiments, the first token is cleartext. According to various embodiments of the present disclosure, the terminal generates the second token only if the first token is determined to be valid. In some embodiments, the second token is generated by encrypting the first token using a basic encryption method, a hashing encryption method, a symmetric encryption method, an asymmetric encryption method, or the like. For example, if the first token included in the verification request is valid, then the client application generates a second token and activates the browser on the terminal to access the website. The terminal (e.g., the browser on the terminal) sends an access request for access of the website.

At 170, an access request including the second token is received. In some embodiments, the server receives an access request including the second token. For example, the server receives the access request including the second token from the terminal.

At 180, a type of the terminal is determined based on the second token. In some embodiments, the server determines a type of terminal based on the second token. According to various embodiments of the present disclosure, if the second token is valid, then the terminal is determined to be a mobile terminal.

According to various embodiments of the present disclosure, in response to receiving the access request including the second token, the server determines whether the second token is valid. For example, the server verifies whether the second token included in the access request is valid according to whether the second token corresponds to an encrypted version of the first token. In some embodiments, the server determines whether the second token is valid by decrypting the second token and comparing the decrypted second token with the first token. If the decrypted second token matches the first token (e.g., stored on the server), then the server determines that the second token is valid.

According to various embodiments of the present disclosure, in response to the terminal (e.g., the client application) receiving, from the server, the result indicating that the first token is valid, the terminal encrypts the first token to generate the second token. The browser on the terminal may be activated to cause the browser to send an access request for accessing the website to the serer. In some embodiments, the access request includes the second token. The server receives the access request for accessing the website sent from the browser and verifies whether the second token included in the access request is valid. In some embodiments, because the second token is generated by the client application encrypting the first token when the first token is valid, the second token is decrypted to obtain the first token and to verify whether the first token is valid. If the first token is valid, then the second token can be determined to be valid.

If the second token is determined to be valid, then the terminal is a mobile terminal. For example, if the second token is determined to be valid, then the server determines that the terminal with which the user logged into the website is a mobile terminal.

According to various embodiments of the present application, the server generates the first token in response to authenticating the login information used to log in to the website. For example, in some embodiments, the method for determining whether the terminal accessing the website is a mobile terminal includes verifying whether the login information sent to the server by the terminal (e.g., entered by the user) when logging into the website is correct, and if the login information is determined to be correct, then the sever generates the first token. The server may verify the login information when the terminal (e.g., the user) logs into the website (e.g., via the browser on the terminal). If the login information is verified (e.g., if the login information is correct), then the first token is generated. In some embodiments, the login information includes a user account identifier (e.g., login name, account number, and/or the like), a password, and/or the like. If the login information is not verified (e.g., if the login information is not correct), then the method for determining whether the terminal accessing the website is a mobile terminal may end.

Figure 2:
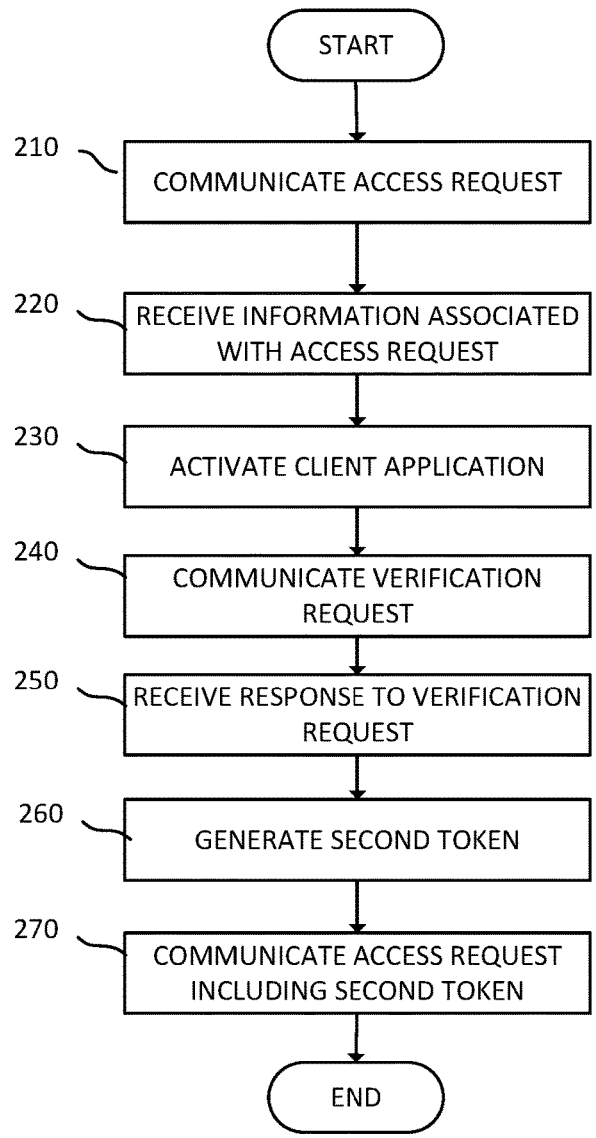
FIG. 2 is a flowchart for determining whether a terminal accessing a website is a mobile terminal according to various embodiments of the present disclosure.

FIG. 2 is a flowchart for determining whether a terminal accessing a website is a mobile terminal according to various embodiments of the present disclosure.

Referring to FIG. 2, a method 200 for a terminal accessing a website is illustrated. In some embodiments, the method 200 is implemented by a terminal 510 illustrated in FIG. 5.

At 210, an access request is communicated. In some embodiments, the terminal communicates an access request to a server associated with a website (e.g., a website server). In some embodiments, the access request includes an IP address of the terminal, and/or the like. For example, the access request may include information from which the terminal may be identified. In some embodiments, the access request is associated with a request to access or otherwise attempt to log in to the website.

At 220, information associated with the access request is received. In some embodiments, the terminal receives information associated with the access request. The terminal receives the information associated with the access request from a server (e.g., the server to which the terminal communicated the access request). In some embodiments, the information associated with the access request includes a page (or a link thereto) including a redirect script. The information associated with the access request that is received by the terminal causes the terminal to execute the redirect script. In some embodiments, the redirect script is configured to cause the terminal (e.g., the browser on the terminal) to access an activation link that activates a client application on the terminal in order to activate the client application. The redirect script may include an activation link.

At 230, a client application is activated. In some embodiments, the terminal activates a client application. In response to receiving the information associated with the access request, the terminal activates the client application. For example, in response to receiving the redirect script, the terminal (e.g., the browser on the terminal) carries out page redirection in accordance with the redirect script. The page redirection causes the terminal (e.g., the browser on the terminal) to access an activation link of the client application included in the redirect script. In some embodiments, in response to accessing the activation link of the client application, the terminal activates (e.g., wakes up) the client application.

According to various embodiments of the present disclosure, the terminal acquires (e.g., receives, retrieves, and/or the like) the first token in connection with the activation of the client application. For example, the client application acquires the first token from the activation link. The client application acquires the access address of the website, the first token, and/or the like from the activation link and/or by accessing the activation link.

At 240, a verification request is communicated. In some embodiments, the terminal communicates a verification request to the server. In some embodiments, the verification request includes the first token. For example, the verification request includes the first token that the client application acquired from the activation link. The terminal may generate and/or communicate the verification request in response to the client application being activated.

At 250, a response to the verification request is received. In some embodiments, the terminal receives a response to the verification request. For example, the terminal receives a response to the verification request from the server. The server determines whether the first token included in the verification request is valid, and in response to determining that the first token included in the verification request is valid, the server communicates the response to the verification request. In some embodiments, the response to the verification request includes an indication as to whether the first token included in the verification request is valid.

At 260, a second token is generated. In some embodiments, the terminal generates a second token. For example, the terminal generates the second token in response to receiving an indication that the first token included in the verification request is valid. In some embodiments, if the first token included in the verification request is valid, then the client application generates the second token and activates the browser on the terminal to access the website. In some embodiments, the terminal (e.g., the client application) generates the second token by encrypting the first token using a known encryption technique such as MD5 or the like.

At 270, an access request including the second token is communicated. In some embodiments, the terminal communicates an access request including the second token. For example, in response to the client application activating the browser on the terminal to access the website, the terminal communicates the access request including the second token.

Figure 3:
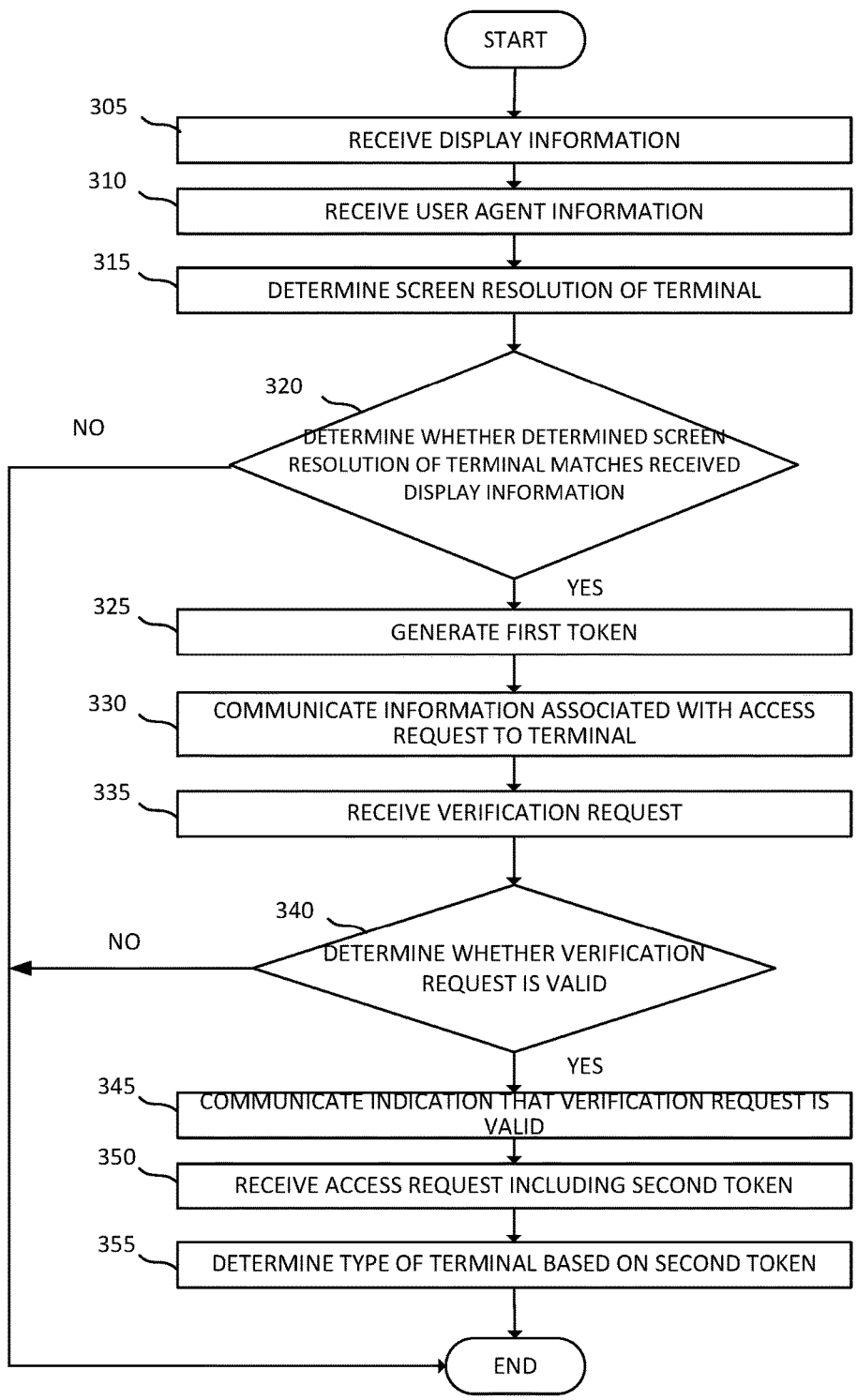
FIG. 3 is a flowchart of a method for determining whether a terminal accessing a website is a mobile terminal according to various embodiments of the present disclosure.

FIG. 3 is a flowchart of a method for determining whether a terminal accessing a website is a mobile terminal according to various embodiments of the present disclosure.

Referring to FIG. 3, a method 300 is for one or more servers, operating individually or in combination, to verify (e.g., determine) whether a terminal accessing (e.g., logging into) a website is a mobile terminal. In some embodiments, the method 300 may be implemented by a server 520 illustrated in FIG. 5.

At 305, display information is received. In some embodiments, a server (e.g., a website server associated with a website) receives display information from a terminal. In some embodiments, the display information includes screen resolution information for the terminal. As an example, the display information is included or otherwise received in connection with an access request from the terminal attempting to access the website or attempting to log into the website. For example, when a terminal (e.g., a user) logs into the website via a browser on the terminal, the terminal (e.g., the browser) communicates a message to the server. In some embodiments, the message communicated to the server includes screen resolution information for the terminal. The browser can acquire the screen resolution for the terminal therefrom. For example, in some embodiments, the browser executes an execution program for acquiring the resolution on the page. As an example, the execution program is written in advance in script language (e.g., in JavaScript language) to acquire the resolution on the page and send a message including the screen resolution to the server. According to various embodiments of the present disclosure, the screen resolution is included in the HTTP request sent by the terminal (e.g., the browser) to the server.

At 310, the user agent information of the terminal is acquired. In some embodiments, the server may acquire the user agent information of the terminal (e.g., the user agent information of the browser). According to various embodiments of the present disclosure, the server determines the equipment type of the terminal using the user agent information included in the User-Agent header of the HTTP request. For example, the server stores a mapping table associating an equipment type with data included in user agent information, and uses the user agent information to look up in the mapping table the equipment type. As another example, the user agent information includes data indicative of the specific equipment type of the corresponding terminal (e.g., the terminal on which the browser is executed).

According to various embodiments of the present disclosure, the browser includes the user agent information in an HTTP request associated with accessing a web page. In some embodiments, the user agent information includes identifiers (e.g., provided to the accessed website). For example, the identifiers included in the user agent information include a browser type, an operating system, and a browser core that the terminal uses, and/or the like. Accordingly, the user agent information of the browser can be acquired from the HTTP request communicated by the terminal to the server. In some embodiments, the server analyzes the user agent information and/or the HTTP request and the server determines the equipment type of the terminal therefrom.

According to various embodiments of the present disclosure, the server contemporaneously receives the display information and the user agent information. For example, the display information and the user agent information is included in an access request (e.g., the HTTP request, and/or the like). In some embodiments, 305 and 310 are combined or otherwise performed concurrently.

At 315, a screen resolution of the terminal is determined. In some embodiments, the server determines the screen resolution of the terminal. According to various embodiments of the present disclosure, the equipment type is used as a basis for determining the screen resolution corresponding to the equipment type. For example, in some embodiments, because the screen resolution of the terminal is set during use, the server determines the screen resolution of the terminal through analysis of (e.g., through a determination of) the equipment type of the terminal. In some embodiments, the server stores the relationship between the equipment type and the screen resolution. According to various embodiments of the present disclosure, after acquiring the equipment type of the terminal by analyzing the user agent information of the browser, the server determines the screen resolution corresponding to the equipment type based on the relationship between the equipment type and the screen resolution.

At 320, a determination is made of whether the determined screen resolution is the same as the received display information. In some embodiments, the server determines whether the determined screen resolution (e.g., the screen resolution determined using the agent information) is the same (e.g., matches) as the received display information. For example, the server determines whether the screen resolution determined using the agent information is identical to the screen resolution included in the display information that is included in the HTTP request included or otherwise received in connection with the access request from the terminal attempting to access the website or attempting to log into the website. The server compares the screen resolution corresponding to the equipment type to the terminal screen resolution that was received from the browser. Accordingly, the server determines whether the screen resolution corresponding to the equipment type and the terminal screen resolution that was received from the browser are the same. For example, the screen resolution corresponding to the equipment type of the terminal that was acquired by analyzing the browser user agent information is compared to the terminal screen resolution that was received from the browser to determine whether the screen resolution corresponding to the equipment type of the terminal that was acquired by analyzing the browser user agent information and the terminal screen resolution that was received from the browser are the same.

If the server determines that the determined screen resolution (e.g., the screen resolution determined using the agent information) is not the same as the received display information at 320 (in other words, the two resolutions do not match), then the method for determining whether the terminal accessing the website is a mobile terminal may end. For example, if the screen resolution corresponding to the equipment type and the terminal screen resolution that was received from the browser are different, then the terminal used by the user to log into or otherwise access the website is determined to not be a mobile terminal. This is because hackers sometimes alter the user agent information included in the HTTP request to pretend that the request is sent from a mobile terminal rather than a non-mobile terminal such as a personal computer, in order to gain access to restricted, mobile-device only webpages. Checking the screen resolution and any discrepancy between the HTTP request and the terminal can detect some fake requests.

In contrast, if the server determines that the determined screen resolution (e.g., the screen resolution determined using the agent information) is the same (e.g., matches) as the received display information at 320, then the server proceeds to 325 at which the server generates a first token. For example, if the screen resolution corresponding to the equipment type is the same as the terminal screen resolution that was received from the browser, then the server generates a first token and saves the first token on the server (or on a storage device connected to the server). In other words, if the result of a comparison between the screen resolution corresponding to the equipment type and the terminal screen resolution that was received from the browser is that the screen resolution corresponding to the equipment type and the terminal screen resolution that was received from the browser are the same, then a first token is generated. In some embodiments, the first token is generated by the server. According to various embodiments of the present disclosure, the first token includes an IP address of the terminal, a physical address (e.g., a MAC address) of the server, a timestamp (e.g., a timestamp for the generation of the first token), a serial number, and/or the like. In some embodiments, the first token is a unique token. For example, in some embodiments, the server associates a new serial number with a corresponding first token. Each time the server generates a first token, the server increases a serial number by one (e.g., a serial number generator may increase a count of generated serial numbers by one for each serial number generated) and the serial number is associated with the first token currently generated so as to ensure the uniqueness of the first token. According to various embodiments of the present disclosure, the first token has an expiration date or time, a period of time for which the first token remains valid, and/or the like. In some embodiments, the first token is saved on the server for a period of time (e.g., until the expiration date or time has passed, until the period of time for which the first token remains valid has expired, and/or the like). For example, the server stores the first token until the first token expires, so that the first token may be used while the first token has not expired (e.g., in the unexpired period) in order to verify (e.g., determine) whether the terminal logging into the website is a mobile terminal. According to various embodiments of the present disclosure, in response to expiration of the first token, the server deletes the first token.

At 330, information associated with the access request is communicated. In some embodiments, the server communicates information associated with the access request to the terminal. For example, the server sends the first token to the terminal. As another example, the server sends a page including a redirect script to the terminal (e.g., to the browser on the terminal). In some embodiments, the information associated with the access request that is communicated to the terminal causes the terminal to execute the redirect script (e.g., the server communicates information to the terminal that causes the browser to execute the redirect script).

In some embodiments, the terminal sends, to the server, the verification request in response to an activation link being accessed by the terminal. In some embodiments, in response to the activation link being accessed by the terminal, a client application is activated on the terminal.

According to various embodiments of the present disclosure, the redirect script is configured to cause the terminal (e.g., browser on the terminal) to access an activation link that activates a client application on the terminal in order to activate the client application. In some embodiments, the redirect script includes an activation link for activating a client application installed on the terminal. The client application may be any one of one or more client applications installed on the terminal. In some embodiments, the activation link (e.g., an Open Uniform Resource Locator (URL), or the like) is defined for one client application installed on the terminal and corresponds to a link that enables the client application to be activated by other client applications. Each client application can define an activation link. In response to another application (e.g., another client application) on the terminal executing the activation link, the terminal (e.g., the other application) can activate the client application. For example, a client application activation link is entered in a browser on a terminal, and the client application is activated (e.g., woken up) by accessing the activation link. According to various embodiments of the present disclosure, a page including a redirect script is sent to the browser of the terminal (e.g., the server sends the page including the redirect script to the browser of the terminal). In some embodiments, the redirect script is a JavaScript script (e.g., an execution code written in JavaScript language), and/or the like. If the terminal (e.g., the browser or other application on the terminal) executes the redirect script (e.g., executes the redirect script after reading and analyzing the redirect script through a JavaScript engine), then the browser carries out a page redirect to access the client application activation link included in the redirect script and thus can activate the client application.

At 335, a verification request is received. In some embodiments, the server receives a verification request. For example, the server receives the verification request from the terminal. In some embodiments, the verification request is sent by the client application on the terminal. According to various embodiments of the present disclosure, the verification request includes the first token that was received by the terminal from the server. For example, the verification request includes the first token acquired by the client application from the activation link.

In some embodiments, the client application is activated by the terminal (e.g., the browser on the terminal) executing the redirect script and thereafter the activation link. According to various embodiments of the present disclosure, the activation link includes an access address of the website, the first token, and/or the like. In some embodiments, the client application acquires the access address of the website, the first token, and/or the like from the activation link and/or by accessing the activation link.

According to various embodiments of the present disclosure, in response to the terminal (e.g., the browser on the terminal) executing the redirect script and then accessing the activation link, the client application is activated (e.g., woken up, and/or the like). In some embodiments, the client application acquires the access address of the website, the first token, and/or the like from the activation link and/or by accessing the activation link. The client application uses the access address as a basis for sending a verification request to the server requesting verification as to whether the first token is valid. In some embodiments, the terminal (e.g., the client application) generates the verification request in response to the client application being activated. In some embodiments, the verification request includes the first token, and/or the like.

At 340, a determination of whether the verification request is valid is made. In some embodiments, the server determines whether the verification request is valid. For example, the server validates the first token. According to various embodiments of the present disclosure, the server determines whether the first token included in the verification request is valid. Thereafter, the verification result (e.g., a result of the determination as to whether the first token included in the verification request is valid) is sent to the terminal (e.g., the client application).

According to various embodiments of the present disclosure, the server stores the first token for a period of time (e.g., until the first token expires). As an example, the period of time may be ten seconds. In some embodiments, the server deletes the first token if the first token is past the expiration time thereof.

The server determines whether the first token included in the verification request is valid by comparing the first token included in the verification request with the first token generated in response to the access request. For example, in response to receiving a verification request from the terminal (e.g., the client application), the server can be queried to determine whether the server has (e.g., is storing) a first token that is the same as the first token included in the verification request. If the server has a first token that is identical to the first token included in the verification request, then the first token is confirmed as valid.

If the verification request is determined not to be valid (e.g., if the first token included in the verification request is determined to not be valid) at 340, then the method for determining whether the terminal is a mobile terminal may end. For example, in some embodiments, the server determines that the terminal attempting to log into the website is not a mobile terminal.

In contrast, if the verification request is determined to be valid (e.g., if the first token included in the verification request is determined to be valid) at 340, then, at 345, an indication that the verification request is valid is communicated. In some embodiments, the server may communicate an indication that the verification request is valid. For example, in response to the server determining that the first token included in the verification request is valid (e.g., matches the first token generated in response to the access request), the server sends an indication to the terminal that the verification request is valid.

According to various embodiments of the present disclosure, in response to receiving an indication that the verification request is valid (e.g., that the first token included in the verification request is valid), the terminal generates a second token. For example, the terminal (e.g., the client application) generates the second token by encrypting the first token. According to various embodiments of the present disclosure, the terminal generates the second token only if the first token is determined to be valid. For example, if the first token included in the verification request is valid, then the client application generates a second token and activates the browser on the terminal to access the website. The terminal (e.g., the browser on the terminal) sends an access request for access of the website.

At 350, an access request including the second token is received. In some embodiments, the server receives an access request including the second token. For example, the server receives the access request including the second token from the terminal.

At 355, a type of terminal is determined based on the second token. In some embodiments, the server determines a type of terminal based on the second token. According to various embodiments of the present disclosure, if the second token is valid, then the terminal is determined to be a mobile terminal.

According to various embodiments of the present disclosure, in response to receiving the access request including the second token, the server determines whether the second token is valid. For example, the server verifies whether the second token included in the access request is valid according to whether the second token corresponds to an encrypted version of the first token so as to determine whether the terminal is a mobile terminal. In some embodiments, the server determines whether the second token is valid by decrypting the second token and comparing the decrypted second token with the first token. If the decrypted second token matches the first token (e.g., stored on the server), then the server determines that the second token is valid.

According to various embodiments of the present disclosure, in response to the terminal (e.g., the client application) receiving, from the server, an indication that the first token is valid, the terminal (e.g., the client application) encrypts the first token and generates a second token. If the first token included in the verification request is not valid, then the server determines that the terminal used by the user to log into the website is not a mobile terminal.

According to various embodiments of the present disclosure, in response to the client application receiving, from the server, the result indicating whether the first token is valid, if the first token is valid, the client can encrypt the first token to generate the second token. In some embodiments, the browser on the terminal is activated to cause the browser to send an access request for accessing the website to the server. In some embodiments, the access request includes the second token. The second token is generated as a result of the client application encrypting the first token when the first token is determined to be valid.

The server receives the access request for accessing the website sent from the browser and verifies whether the second token included in the access request is valid. For example, the server decrypts the second token to obtain the first token, and the first token is verified as to whether the first token obtained by virtue of decrypting the second token is valid. For example, the server is queried as to whether the server has a first token that is the same as the first token obtained from the decryption of the second token. If the server does have a first token that is the same as the first token obtained from the decryption of the second token, then the first token is confirmed as valid. If the first token obtained from the decryption of the second token is valid, then the second token can be confirmed as valid.

According to various embodiments of the present disclosure, if the second token is determined to be valid, then the terminal is deemed to be a mobile terminal. For example, if the second token is valid, then the terminal with which the user logged into the website is determined to be a mobile terminal. In contrast, if the second token is determined not to be valid, then the terminal used by the user to log into the website is determined not to be a mobile terminal.

According to various embodiments of the present application, the method for determining whether a terminal accessing a website is a mobile terminal includes writing the second token into a cookie sent to the terminal (e.g., the browser on the terminal). For example, if the second token is determined to be valid, then the second token is written into a cookie sent to the browser.

According to various embodiments of the present disclosure, the cookie is generated by the server and sent to the browser. The browser generally will save the cookie in a text file under a directory on the terminal. In connection with a subsequent request to access the website (e.g., the next time the same website is requested) the browser will send the cookie to the server. Therefore, the server can place the second token in the cookie that is sent to the browser and send the cookie including the second token to the browser.

In some embodiments, the server sets an expiration date for the second token (e.g., in one month). When the terminal (e.g., the user) again logs into the website using the browser, the cookie of the browser is checked to determine whether the cookie includes the second token. If the cookie of the browser is determined to include the second token, the second token contained in the cookie is verified to confirm that the second token is valid. For example, the server is queried as to whether the server has (e.g., is storing) the second token. If the server does have the second token, then the second token included in the cookie of the browser is confirmed as valid. If the second token included in the cookie of the browser is confirmed as valid, then the terminal that is running the browser is confirmed as a mobile terminal.

According to various embodiments of the present disclosure, if the second token included in the cookie of the browser has not yet expired (e.g., prior to the expiration date of the second token), 305 to 345 need not be executed. For example, the terminal that is logging into the website can be verified as a mobile terminal or as a non-mobile terminal. As another example, the terminal that is logging into the website is to be verified as to whether the terminal that is logging into the website is the terminal that acquired the cookie. For example, the server may determine whether the terminal that is logging into the website corresponds to the terminal that previously acquired the cookie by acquiring identification information of the terminal that is logging into the website (e.g., the user agent information, IP address information, and/or the like) in the HTTP request sent by the terminal to the server. In some embodiments, the server saves the relationship between the cookie and the identity of the terminal that acquired the cookie (e.g., using the user agent information, IP address information, and/or the like of the terminal). In some embodiments, the server uses the relationship between the cookie and the identity of the terminal that acquired the cookie as a basis for determining whether the terminal used to log into the website is the terminal that previously acquired the cookie. If the terminal used to log into the website is not the terminal that previously acquired the cookie, then the terminal used to log into the website (e.g., the user) is not permitted to log into the website via this terminal.

According to various embodiments of the present application, the method for determining whether a terminal accessing a website is a mobile terminal includes verifying whether the login information entered by the terminal (e.g., the user) when logging into the website is correct. In some embodiments, if the login information is correct, then the first token is generated. In other words, if the screen resolution corresponding to the equipment type and the terminal screen resolution that was received from the browser are the same, then the login information entered by the user is verified to confirm that the login information is correct. In some embodiments, the login information includes an account identifier (e.g., a login name, an account number, and/or the like), a password, and other information entered by the user. If the login information is confirmed to be correct, then the first token may be generated.

Figure 4:
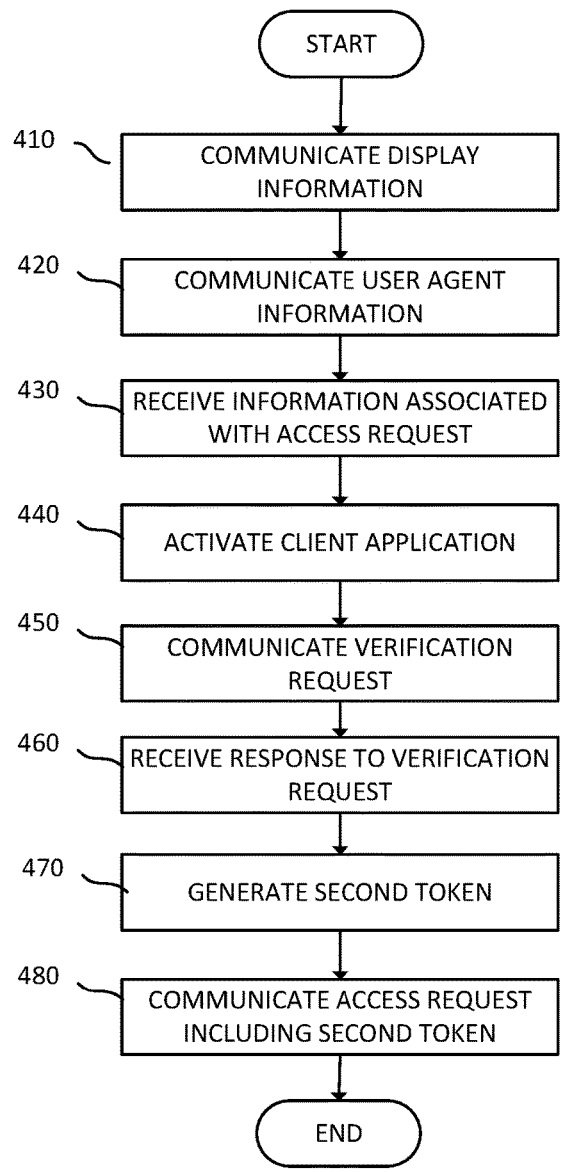
FIG. 4 is a flowchart of a method for determining whether a terminal accessing a website is a mobile terminal according to various embodiments of the present disclosure.

FIG. 4 is a flowchart of a terminal accessing a website, according to various embodiments of the present disclosure.

Referring to FIG. 4, a method 400 for a terminal accessing a website is illustrated. In some embodiments, the method 400 may be implemented by a terminal 510 of FIG. 5.

At 410, display information is communicated. In some embodiments, the terminal communicates display information to a server associated with a website (e.g., a website server). In some embodiments, the display information includes screen resolution information for the terminal. In some embodiments, the display information is included or otherwise received in connection with an access request from the terminal attempting to access the website or attempting to log into the website. For example, when the terminal (e.g., a user) logs into the website via a browser on the terminal, the terminal (e.g., the browser) communicates a message to the server. In some embodiments, the message communicated to the server includes screen resolution information for the terminal. In some embodiments, the browser acquires the screen resolution for the terminal therefrom. For example, the browser may execute an execution program for acquiring the resolution on the page. In some embodiments, the execution program is written in advance in script language (e.g., in JavaScript language) for acquiring the resolution on the page and sending a message including the screen resolution to the server. According to various embodiments of the present disclosure, the screen resolution is included in the HTTP request sent by the terminal (e.g., the browser) to the server.

At 420, user agent information of the terminal is communicated. In some embodiments, the terminal communicates user agent information of the terminal (e.g., user agent information of the browser) to the server associated with the website. In some embodiments, the user agent information includes data from which the equipment type of the terminal may be determined. For example, the user agent information includes data indicative of the specific equipment type of the corresponding terminal (e.g., the terminal on which the browser is executed).

According to various embodiments of the present disclosure, the browser includes the user agent information in an HTTP request associated with accessing a web page. In some embodiments, the user agent information includes identifiers (e.g., provided to the accessed website). For example, the identifiers included in the user agent information include a browser type, an operating system, and a browser core that the terminal uses, and/or the like.

According to various embodiments of the present disclosure, the terminal contemporaneously sends the display information and the user agent information to the server. For example, the display information and the user agent information are included in an access request (e.g., the HTTP request, and/or the like). For example, 410 and 420 may be combined or otherwise performed concurrently.

The terminal communicates an access request to the server associated with the website (e.g., a website server). In some embodiments, the access request includes an IP address of the terminal, and/or the like. For example, the access request includes information from which the terminal may be identified. In some embodiments, the access request is associated with a request to access or otherwise attempt to log in to the website. The access request may include one or more of the display information and the user agent information.

At 430, information associated with the access request is received. In some embodiments, the terminal receives information associated with the access request. For example, the terminal receives the information associated with the access request from a server (e.g., the server to which the terminal communicated the access request). In some embodiments, the information associated with the access request includes a page (or a link thereto) including a redirect script. In some embodiments, the information associated with the access request that is received by the terminal causes the terminal to execute the redirect script. For example, the redirect script is configured to cause the terminal (e.g., the browser on the terminal) to access an activation link that activates a client application on the terminal in order to activate the client application. In some embodiments, the redirect script includes an activation link.

At 440, a client application is activated. In some embodiments, the terminal activates a client application. In some embodiments, in response to receiving the information associated with the access request, the terminal activates the client application. For example, in response to receiving the redirect script, the terminal (e.g., the browser on the terminal) carries out page redirection in accordance with the redirect script. In some embodiments, page redirection causes the terminal (e.g., the browser on the terminal) to access an activation link of the client application included in the redirect script. In some embodiments, in response to accessing the activation link of the client application, the terminal activates (e.g., wakes up) the client application.

According to various embodiments of the present disclosure, the terminal acquires (e.g., receives, retrieves, and/or the like) the first token in connection with the activation of the client application. For example, the client application acquires the first token from the activation link. The client application acquires the access address of the website, the first token, and/or the like from the activation link and/or by accessing the activation link.

At 450, a verification request is communicated. In some embodiments, the terminal communicates a verification request to the server. In some embodiments, the verification request includes the first token. For example, the verification request includes the first token that the client application acquired from the activation link. In some embodiments, the terminal may generate and/or communicate the verification request in response to the client application being activated.

At 460, a response to the verification request is received. In some embodiments, the terminal receives a response to the verification request. As an example, the terminal receives a response to the verification request from the server. In some embodiments, the server determines whether the first token included in the verification request is valid, and in response to determining that the first token included in the verification request is valid, the server communicates the response to the verification request. In some embodiments, the response to the verification request includes an indication as to whether the first token included in the verification request is valid.

At 470, a second token is generated. In some embodiments, the terminal generates a second token. As an example, the terminal generates the second token in response to receiving an indication that the first token included in the verification request is valid. In some embodiments, if the first token included in the verification request is valid, then the client application generates the second token and activates the browser on the terminal to access the website. In some embodiments, the terminal (e.g., the client application) generates the second token by encrypting the first token.

At 480, an access request including the second token is communicated. In some embodiments, the terminal communicates an access request including the second token. As an example, in response to the client application activating the browser on the terminal to access the website, the terminal communicates the access request including the second token.

According to various embodiments of the present disclosure, the method for accessing the website includes receiving a cookie from the server. In some embodiments, the cookie includes the second token. In some embodiments, the terminal stores the cookie (e.g., in connection with the browser). As an example, in subsequent attempts to access or otherwise log into the website, the terminal sends the cookie to the server. In some embodiments, if the server determines that the second token included in the cookie is valid at the time of the subsequent attempt to access or otherwise log into the website, then the terminal logs into the website without being required to perform 430 to 480.

The present application also provides a server for determining whether a terminal logging into a website is a mobile terminal.

Figure 5:
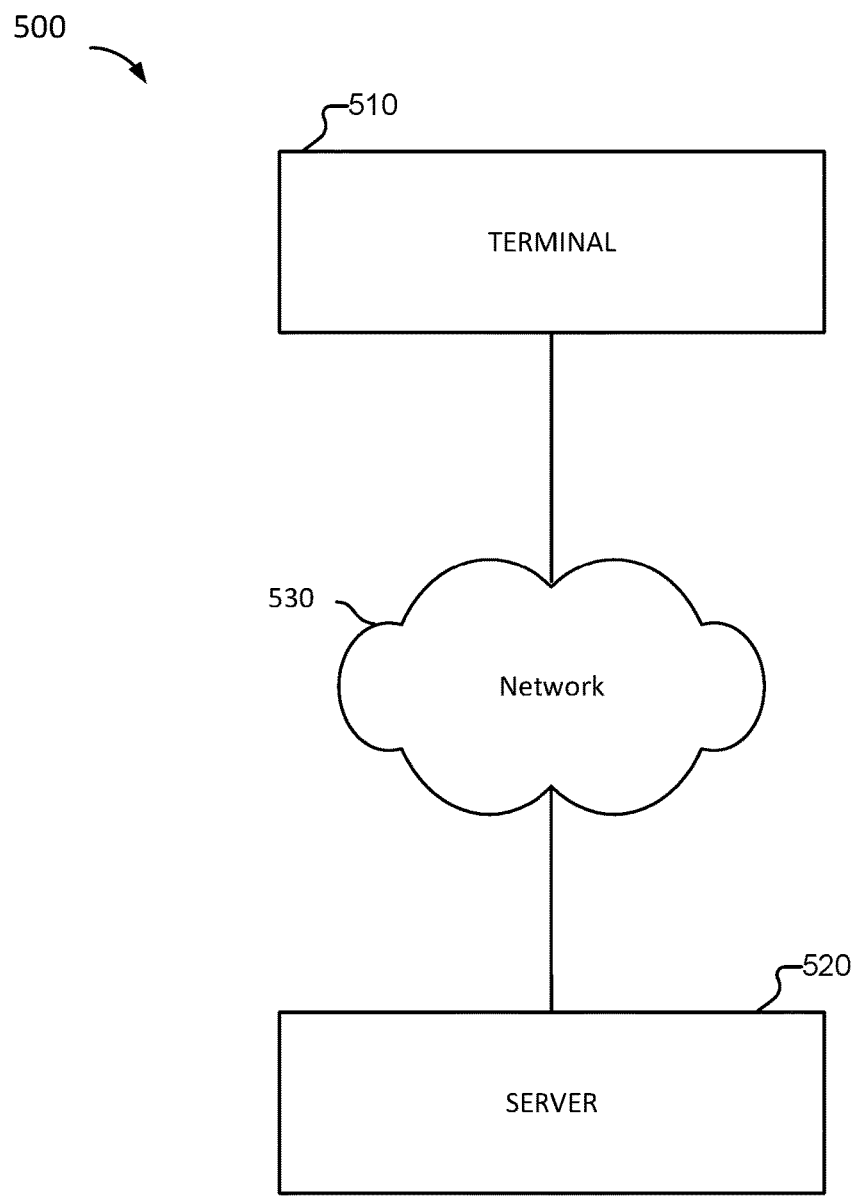
FIG. 5 is a diagram illustrating a system for determining whether a terminal accessing a website is a mobile terminal according to various embodiments of the present disclosure.

FIG. 5 is diagram illustrating a system for determining whether a terminal accessing a website is a mobile terminal, according to various embodiments of the present disclosure.

Referring to FIG. 5, the system 500 for determining whether a terminal accessing a website is a mobile terminal may include a terminal 510, a server 520, and a network 530. As illustrated in FIG. 5, the terminal 510 may communicate with the server 520 across the network 530.

In some embodiments, the terminal 510 accesses or otherwise attempts to log in to a website associated with the server 520. For example, the terminal 510 communicates an access request to the server 520 for accessing the website. In some embodiments, the terminal 510 receives information associated with the access request from the server 520. In some embodiments, the terminal 510 activates a client application which may generate a verification request. Thereafter, the terminal 510 communicates a verification request to the server 520. In some embodiments, the terminal 510 receives a response to the verification request from the server 520. In some embodiments, in response to the receiving the response to the verification request, the terminal 510 generates a second token. Thereafter, the terminal 510 communicates an access request including the second token to the server 520.

In some embodiments, the server 520 receives an access request from the terminal 510. In some embodiments, the server 520 authenticates the terminal 510 and communicates information associated with the access request to the terminal 510. In some embodiments, the server 520 receives a verification request from the terminal 510. As an example, in response to receiving the verification request from the terminal 510, the server 520 determines whether the verification request is valid. In some embodiments, the server 520 communicates an indication as to whether the verification request is valid. In some embodiments, the server 520 receives an access request including the second token. As an example, in response to receiving the access request including the second token, the server 520 determines whether the terminal is a mobile terminal according to whether the second token is valid.

Figure 6A:
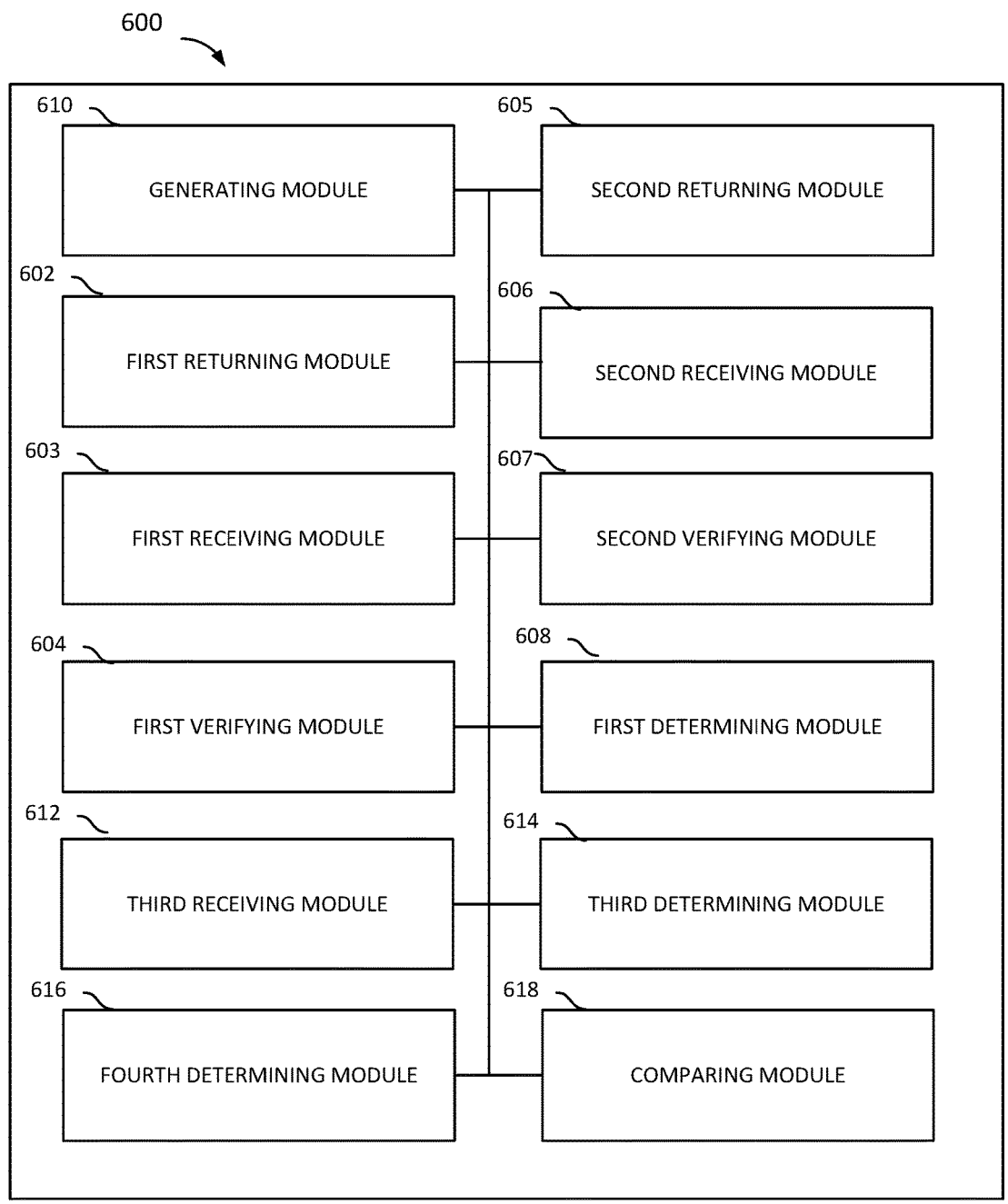
FIG. 6A is a structural block diagram of a server for determining whether a terminal accessing a website is a mobile terminal according to various embodiments of the present disclosure.

FIG. 6A is a structural block diagram of a server for determining whether a terminal logging into a website is a mobile terminal, according to various embodiments of the present disclosure.

Referring to FIG. 6A, a server 600 for determining whether a terminal logging into a website is a mobile terminal is provided. In some embodiments the server 600 implements method 100 illustrated in FIG. 1.

According to various embodiments of the present application, the server 600 includes a generating module 601, a first returning module 602, a first receiving module 603, a first verifying module 604, a second returning module 605, a second receiving module 606, a second verifying module 607, and a first determining module 608.

In some embodiments, the generating module 601 is configured to generate a first token and to save the first token on the server 600 when a user logs into a website via a browser on a terminal. As an example, the generating module 601 generates the first token in response to the server 600 receiving an access request from the terminal.

In some embodiments, the first returning module 602 is configured to communicate a page including a redirect script to the terminal (e.g., to the browser on the terminal) so as to cause the terminal (e.g., the browser on the terminal) to execute the redirect script and thereupon access an activation link so as to activate a client application on the terminal. In some embodiments, the activation link includes the access address of the website and the first token.

In some embodiments, the first receiving module 603 is configured to receive a verification request sent by the terminal (e.g., by the client application). The verification request includes the first token acquired by the client application from the activation link.

In some embodiments, the first verifying module 604 is configured to determine whether the first token included in the verification request is valid.

In some embodiments, the second returning module 605 is configured to communicate a verification result to the client application.

In some embodiments, the second receiving module 606 is configured to receive an access request sent from the browser on the terminal for access to the website if the first token carried in the verification request is valid and in the event that the terminal (e.g., the client application) generates a second token and activates the browser on the terminal to access the website.

In some embodiments, the second verifying module 607 is configured to determine whether the second token included in the access request is valid.

In some embodiments, the first determining module 608 is configured to determine whether the terminal is a mobile terminal. For example, the first determining module 608 is configured to determine that the terminal is a mobile terminal if the second verifying module 607 determines that the second token is valid.

According to various embodiments of the present disclosure, the second token is generated by the client application encrypting the first token.

According to various embodiments of the present application, the second verifying module 607 includes a verifying sub-module and a determining sub-module.

In some embodiments, the verifying sub-module included in the second verifying module 607 is configured to decrypt the second token to obtain the first token and to determine whether the first token obtained through decrypting the second token is valid.

In some embodiments, the determining sub-module included in the second verifying module 607 is configured to determine whether the second token is valid. For example, the determining sub-module determines, if the first token is valid, that the second token is valid and that the terminal is a mobile terminal.

According to various embodiments of the present application, the server 600 may also include a writing module. As an example, the writing module is configured to write the second token into the cookie sent to the terminal (e.g., the browser) if the second token is determined to be valid.

According to various embodiments of the present application, the server 600 includes a checking module, a third verifying module, and a second determining module.

In some embodiments, the checking module is configured to determine, in response to the user logging into the website via a browser on the terminal, whether the cookie of the browser includes the second token.

In some embodiments, the third verifying module is configured to determine whether the second token included in the cookie of the browser is valid when the user is logging into the website via the browser on the terminal.

In some embodiments, the second determining module is configured to determine whether the terminal is a mobile terminal according to the validity of the second token (e.g., the second token included in the cookie). For example, the second determining module is configured to determine that the terminal is a mobile terminal if the second token (e.g., the second token included in the cookie) is valid.

Figure 6B:
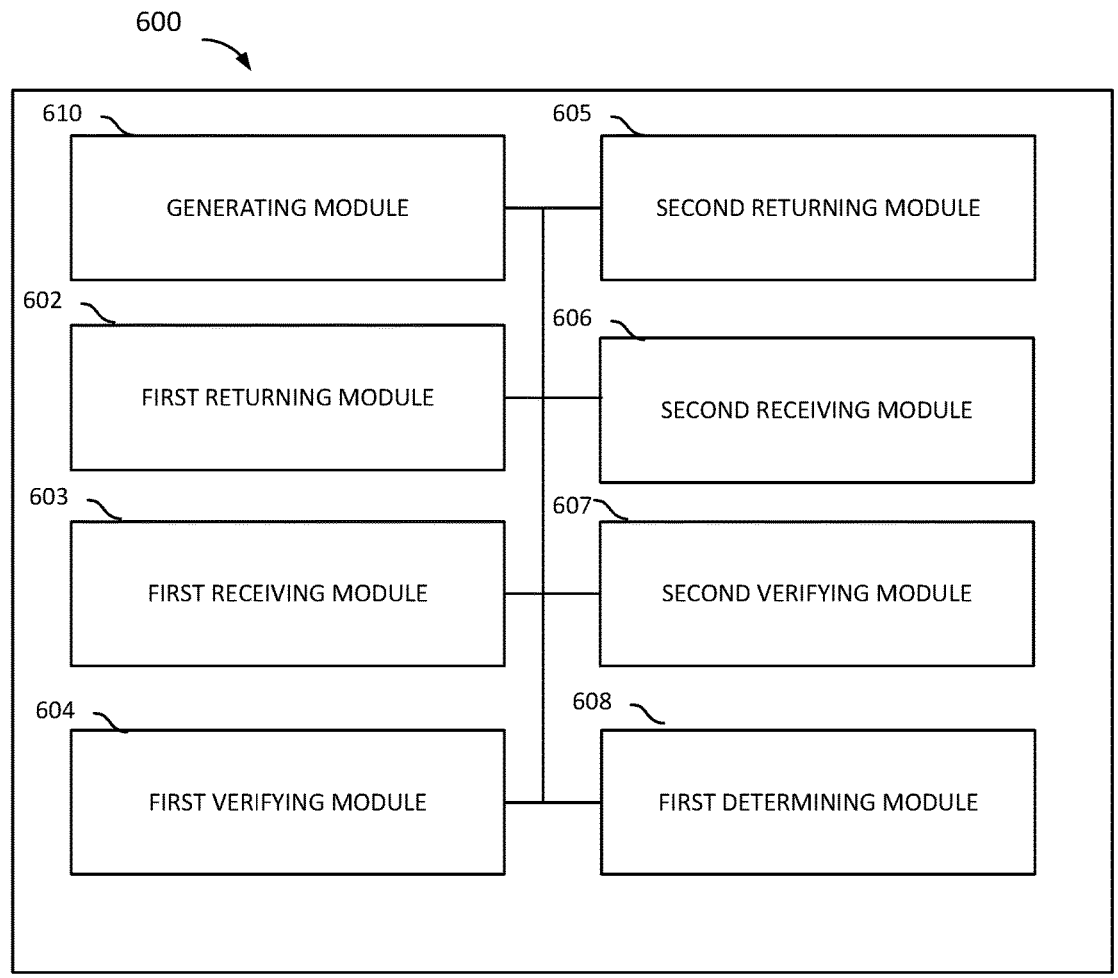
FIG. 6B is a structural block diagram of a server for determining whether a terminal accessing a website is a mobile terminal according to various embodiments of the present disclosure.

FIG. 6B is a structural block diagram of a server for determining whether a terminal logging into a website is a mobile terminal, according to various embodiments of the present disclosure.

Referring to FIG. 6B, a server 600 for determining whether a terminal logging into a website is a mobile terminal is provided. In some embodiments the server 600 implements method 300 illustrated in FIG. 3.

According to various embodiments of the present application, the server 600 includes the generating module 601, the first returning module 602, the first receiving module 603, the first verifying module 604, the second returning module 605, the second receiving module 606, the second verifying module 607, and the first determining module 608.

According to various embodiments of the present application, the server 600 also includes a third receiving module 612, a third determining module 614, a fourth determining module 616, and a comparing module 618.

In some embodiments, the third receiving module 612 is configured to receive, when a terminal (e.g., a user) logs into the website via a browser on the terminal, a message that was sent by the browser and that includes screen resolution information for the terminal.

In some embodiments, the third determining module 614 is configured to acquire the user agent information of the browser and to determine the equipment type of the terminal by analyzing the user agent information.

In some embodiments, the fourth determining 616 module is configured to determine the screen resolution corresponding to the equipment type according to the equipment type of the terminal.

In some embodiments, the comparing module 618 is configured to compare the screen resolution corresponding to the equipment type to the terminal screen resolution that was received from the terminal (e.g., the browser on the terminal) and to determine whether the screen resolution corresponding to the equipment type and the terminal screen resolution that was received from the browser are the same.

The generating module 601 may be further configured to generate a first token if the screen resolution corresponding to the equipment type is the same as the terminal screen resolution that was received from the terminal (e.g., the browser on the terminal).

According to various embodiments of the present application, the server 600 also includes a fourth verifying module and a fifth determining module.

In some embodiments, the fourth verifying module is configured to determine whether the login information entered when the terminal (e.g., the user) logs into the website is correct. For example, the fourth verifying module is configured to authenticate the login information.

In some embodiments, the fifth determining module is configured to determine whether the first token is to be generated according to whether the login information is correct. For example, the fifth determining module is configured to determine that the first token is to be generated if the login information is determined to be correct.

According to various embodiments of the present application, the first verifying module further includes a querying sub-module and/or a determining sub-module.

In some embodiments, the querying sub-module is configured to query the server as to whether the server has (e.g., is storing) a first token that is the same as the first token carried in the verification request.

In some embodiments, the determining sub-module is configured to determine whether the first token is valid. As an example, the determining sub-module is configured to determine whether the first token is valid if the querying sub-module is determined to have the first token. As an example, the determining sub-module is configured to use the first token stored on the server to determine whether the first token received from the terminal is valid.

Because the functions realized by the server 600 of the present embodiment correspond to the method embodiments depicted in FIGS. 1 through 2 above, one may refer to the appropriate descriptions in the above-described embodiments for those parts of the present embodiment that are not described in sufficient detail. This matter will not be discussed further here.

Figure 7:
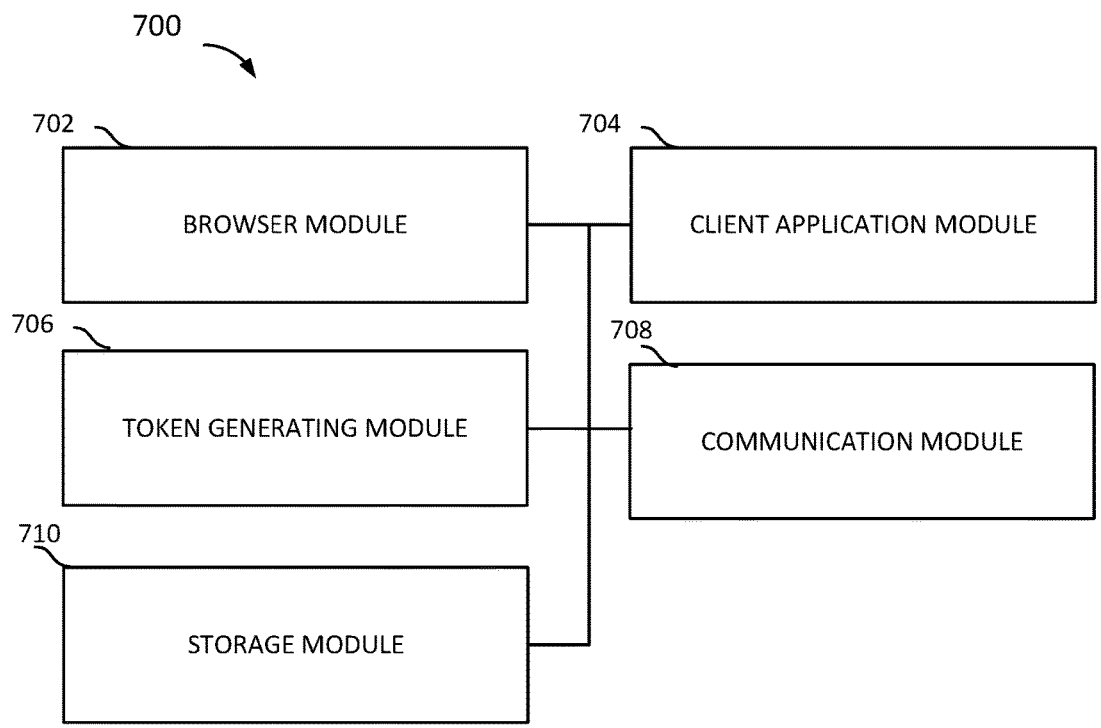
FIG. 7 is a structural block diagram of a terminal in a system for determining whether a terminal accessing a website is a mobile terminal according to various embodiments of the present disclosure.

FIG. 7 is a structural block diagram of a terminal in a system for determining whether a terminal accessing a website is a mobile terminal according to various embodiments of the present disclosure.

Referring to FIG. 7, a terminal 700 in a system for determining whether a terminal accessing a website is a mobile terminal is provided. In some embodiments the terminal 700 implements methods 200 and 400 of FIGS. 2 and 4.

In some embodiments, the terminal 700 includes a browser module 702, a client application module 704, a token generating module 706, a communication module 708, a storage module 710, and/or the like.

In some embodiments, the browser module 702 accesses a website. For example, the browser module 702 operates as an interface between a server hosting a website and a user operating the terminal 700. As an example, the browser module 702 operatively accesses or otherwise logs into the website. In some embodiments, the browser module 702 determines a display resolution of the terminal 700. According to various embodiments of the present disclosure, the browser module 702 operatively communicates, to a server, an access request for accessing the website.

In some embodiments, the client application module 704 operatively communicates with a server to validate whether the terminal 700 is a mobile terminal. As an example, the client application 704 is activated when an activation link is accessed or otherwise processed by the terminal 700 (e.g., the browser module 702). In some embodiments, the client application module 704 acquires a first token from or by otherwise using the activation link. In some embodiments, the client application module 704 generates and operatively communicates a verification request to the server. According to various embodiments of the present disclosure, the client application module 704 generates a second token. In some embodiments, the client application module 704 operatively communicates, to a server, an access request that includes the second token.

In some embodiments, the token generating module 706 generates the second token. As an example, the token generating module 706 generates the second token by encrypting the first token (e.g., the first token that the client application module 704 acquired from or by otherwise using the activation link).

In some embodiments, the communication module 708 communicates with a website (e.g., a server associated with the website). As an example, the communication module 708 is configured to operate as an interface between the website and the other modules of the terminal 700. For example, the other modules of the terminal 700 may send and receive data to another terminal (e.g., a server) via the communication module 708.

In some embodiments, the storage module 710 stores data (e.g., the first token, a cookie, and/or the like) that the terminal 700 receives from other terminals (e.g., from a server) or that the terminal 700 generates (e.g., the second token).

The modules described above can be implemented as software components executing on one or more general purpose processors, as hardware such as programmable logic devices and/or Application Specific Integrated Circuits designed to perform certain functions or a combination thereof. In some embodiments, the modules can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The modules may be implemented on a single device or distributed across multiple devices. The functions of the modules may be merged into one another or further split into multiple sub-modules.

Figure 8:
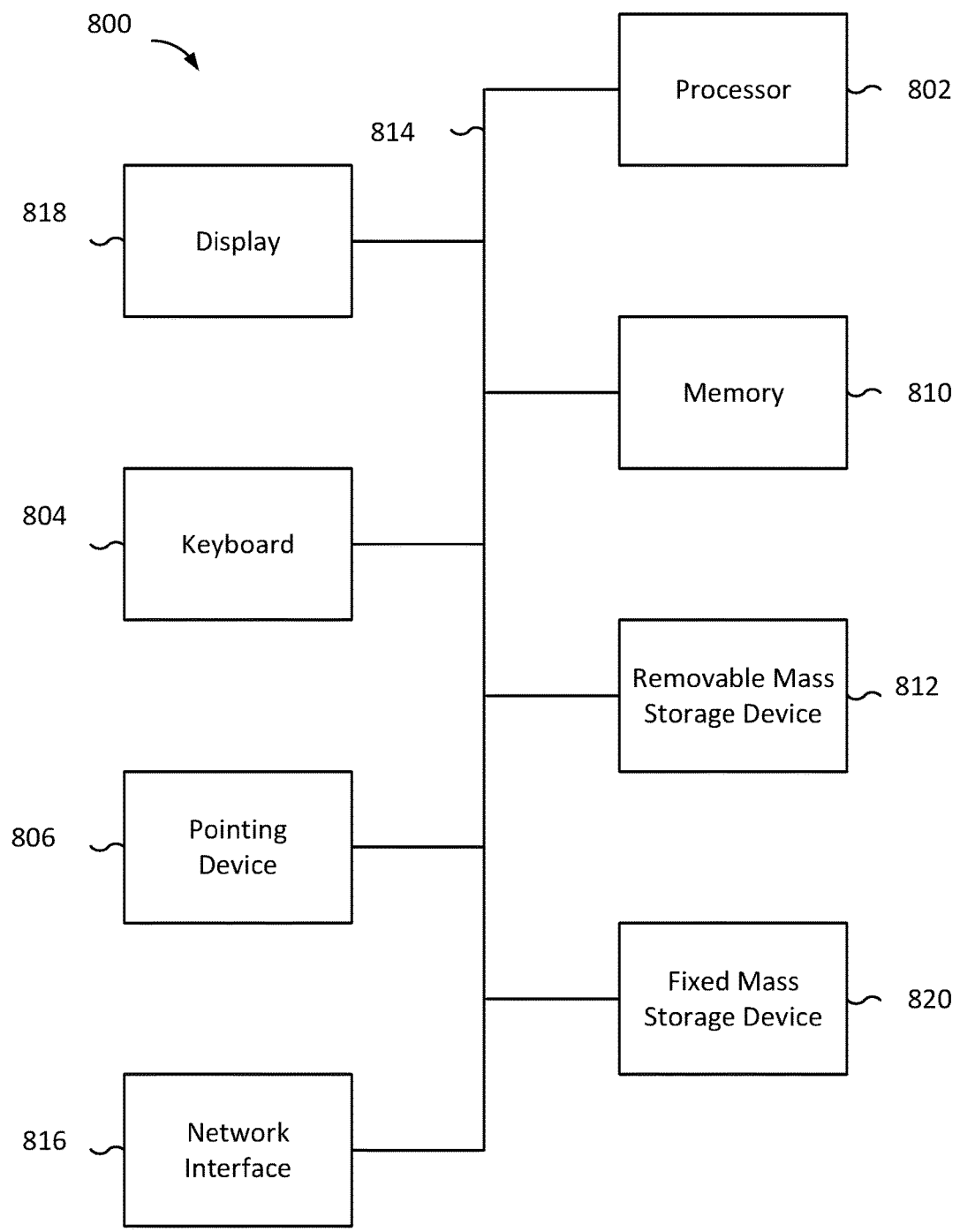
FIG. 8 is a functional diagram of a computer system for accessing a website or for determining whether a terminal accessing the website is a mobile terminal, according to various embodiments of the present disclosure.

FIG. 8 is a functional diagram of a computer system for accessing a website or for determining whether a terminal accessing the website is a mobile terminal, according to various embodiments of the present disclosure.

Referring to FIG. 8, a computer system 800 for accessing a website or for determining whether a terminal accessing the website is a mobile terminal is provided. As will be apparent, other computer system architectures and configurations can be used to implement video calls. Computer system 800, which includes various subsystems as described below, includes at least one microprocessor subsystem (also referred to as a processor or a central processing unit (CPU)) 802. For example, processor 802 can be implemented by a single-chip processor or by multiple processors. In some embodiments, processor 802 is a general purpose digital processor that controls the operation of the computer system 800. Using instructions retrieved from memory 810, the processor 802 controls the reception and manipulation of input data, and the output and display of data on output devices (e.g., display 818).

Processor 802 is coupled bi-directionally with memory 810, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 802. Also as is well known in the art, primary storage typically includes basic operating instructions, program code, data, and objects used by the processor 802 to perform its functions (e.g., programmed instructions). For example, memory 810 can include any suitable computer-readable storage media, described below, depending on whether, for example, data access needs to be bi-directional or uni-directional. For example, processor 802 can also directly and very rapidly retrieve and store frequently needed data in a cache memory (not shown).

A removable mass storage device 812 provides additional data storage capacity for the computer system 800, and is coupled either bi-directionally (read/write) or uni-directionally (read only) to processor 802. For example, storage 812 can also include computer-readable media such as magnetic tape, flash memory, PC-CARDS, portable mass storage devices, holographic storage devices, and other storage devices. A fixed mass storage 820 can also, for example, provide additional data storage capacity. The most common example of mass storage 820 is a hard disk drive. Mass storage device 812 and fixed mass storage 820 generally store additional programming instructions, data, and the like that typically are not in active use by the processor 802. It will be appreciated that the information retained within mass storage device 812 and fixed mass storage 820 can be incorporated, if needed, in standard fashion as part of memory 810 (e.g., RAM) as virtual memory.

In addition to providing processor 802 access to storage subsystems, bus 814 can also be used to provide access to other subsystems and devices. As shown, these can include a display monitor 818, a network interface 816, a keyboard 804, and a pointing device 806, as well as an auxiliary input/output device interface, a sound card, speakers, and other subsystems as needed. For example, the pointing device 806 can be a mouse, stylus, track ball, or tablet, and is useful for interacting with a graphical user interface.

The network interface 816 allows processor 802 to be coupled to another computer, computer network, or telecommunications network using a network connection as shown. For example, through the network interface 816, the processor 802 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 802 can be used to connect the computer system 800 to an external network and transfer data according to standard protocols. For example, various process embodiments disclosed herein can be executed on processor 802, or can be performed across a network such as the Internet, intranet networks, or local area networks, in conjunction with a remote processor that shares a portion of the processing. Additional mass storage devices (not shown) can also be connected to processor 802 through network interface 816.

An auxiliary I/O device interface (not shown) can be used in conjunction with computer system 800. The auxiliary I/O device interface can include general and customized interfaces that allow the processor 802 to send and, more typically, receive data from other devices such as microphones, touch-sensitive displays, transducer card readers, tape readers, voice or handwriting recognizers, biometrics readers, cameras, portable mass storage devices, and other computers.

The computer system shown in FIG. 8 is but an example of a computer system suitable for use with the various embodiments disclosed herein. Other computer systems suitable for such use can include additional or fewer subsystems. In addition, bus 814 is illustrative of any interconnection scheme serving to link the subsystems. Other computer architectures having different configurations of subsystems can also be utilized.

The methods or steps described in light of the embodiments disclosed herein can be implemented using hardware, processor-executed software modules, or combinations of both. Software modules can be installed in random-access memory (RAM), memory, read-only memory (ROM), electrically programmable ROM, electrically erasable programmable ROM, registers, hard drives, removable disks, CD-ROM, or any other forms of storage media known in the technical field.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for determining that a terminal is a mobile terminal, comprising:
   receiving, by a website server, a message from a browser on the terminal, wherein the terminal logs into a website associated with the website server via the browser on the terminal, and wherein the message includes screen resolution information of screen resolution for the terminal;
   receiving user agent information of the browser;
   determining an equipment type of the terminal according to the user agent information of the browser;
   determining a screen resolution corresponding to the equipment type of the terminal;
   determining whether the screen resolution corresponding to the equipment type of the terminal is the same as the screen resolution of the terminal that was received from the browser;
   in response to determining that the screen resolution corresponding to the equipment type of the terminal is the same as the screen resolution that was received from the browser, generating a first token;
   sending, by the web site server, information including a redirect script to the browser on the terminal, the redirect script configured to cause the terminal to execute the redirect script and to access an activation link to activate a client application on the terminal, wherein a version of the first token is provided to the terminal in connection with the terminal accessing the activation link;
   receiving, by the website server, a verification request from the client application on the terminal, wherein the verification request includes the version of the first token that was acquired by the client application on the terminal using the activation link;
   determining, by the web site server, whether the version of the first token included in the verification request is valid relative to the generated first token;
   in response to determining that the version of the first token included in the verification request is valid, sending, by the website server, an indication that the first token is valid to the client application on the terminal;
   receiving, by the website server, an access request to access the website, the access request including a second token, wherein the second token comprises an encryption of the first token;
   determining, by the website server, whether the second token is valid; and
   determining, by the website server, whether the terminal is a mobile terminal according to whether the second token is valid.

2. The method as described in claim 1, wherein the second token is generated by the client application on the terminal that encrypted the first token.

3. The method as described in claim 2, wherein determining whether the second token is valid comprises:
   decrypting the second token to obtain the first token and verifying whether the first token obtained by decrypting the second token is valid; and
   determining that the second token is valid if the first token obtained by decrypting the second token is valid.

4. The method as described in claim 1, further comprising:
   in response to determining that the second token is valid, then writing the second token into a cookie and sending the cookie to browser on the terminal.

5. The method as described in claim 4, further comprising:
   in response to receiving a request from the terminal to log into the website via the browser on the terminal, determining whether a cookie of the browser includes the second token; and
   in response to determining that the cookie of the browser includes the second token, determining whether the second token included in the cookie of the browser is valid.

6. The method as described in claim 5, further comprising:
   in response to determining that the second token included in the cookie of the browser is valid, determining that the terminal is a mobile terminal.

7. The method as described in claim 1, wherein:
the first token is generated further in response to determining that login information received by a server in connection with a login request for accessing the website is correct.

8. The method as described in claim 1, wherein the determining whether the version of the first token included in the verification request is valid further comprises:
determining whether a first token that is the same as the version of the first token included in the verification request is stored on a storage associated with the website server; and
determining that the first token is valid if the storage associated with the website server is determined to have the first token that is the same as the version of the first token included in the verification request.

9. The method as described in claim 1, further comprising:
in response to determining that the terminal is a mobile terminal, permitting the terminal to access the website.

10. The method of claim 1, wherein the second token is based at least in part on the first token.

11. The method of claim 1, wherein the first token is generated in response to information communicated in connection with the access request being authenticated.

12. The method of claim 1, wherein the determining whether the terminal is a mobile terminal comprises:
in response to determining that the second token is valid, determining that the terminal is a mobile terminal.

13. The method of claim 12, wherein the determining whether the second token is valid comprises:
decrypting, by the website server, the second token to obtain a decrypted version of the second token;
obtaining, by the website server, a version of the first token stored at the server side; and
comparing, by the website server, the decrypted version of the second token with the version of the first token stored to the server side.

14. The method of claim 1, wherein the website server comprises one or more servers that provide access to the website.

15. The method of claim 1, wherein the first token comprises one or more characteristics associated with the terminal.

16. A server comprising:
one or more processors configured to:
receive a message from a browser on the terminal, wherein the terminal logs into a website associated with the server via the browser on the terminal, and wherein the message includes screen resolution information of screen resolution for the terminal;
receive user agent information of the browser;
determine an equipment type of the terminal according to the user agent information of the browser;
determine a screen resolution corresponding to the equipment type of the terminal;
determine whether the screen resolution corresponding to the equipment type of the terminal is the same as the screen resolution of the terminal that was received from the browser;
in response to determining that the screen resolution corresponding to the equipment type of the terminal is the same as the screen resolution that was received from the browser, generate a first token;
send information including a redirect script to a browser on the terminal, the redirect script configured to cause the browser on the terminal to execute the redirect script and to access an activation link to activate a client application on the terminal, wherein a version of the first token is provided to the terminal in connection with the terminal accessing the activation link;
receive a verification request from the client application on the terminal, wherein the verification request includes the version of the first token that was acquired by the client application on the terminal using the activation link;
determine whether the version of the first token included in the verification request is valid relative to the generated first token;
send, to the client application on the terminal, an indication that the first token is valid in response to determining that the version of the first token included in the verification request is valid;
receive an access request to access the website, the access including a second token, wherein the second token comprises an encryption of the first token;
determine whether the second token is valid; and
determine whether the terminal is a mobile terminal according to whether the second token is valid;
a memory coupled to the one or more processors and configured to provide the one or more processors with instructions.

17. The server as described in claim 16, wherein the second token is generated by the client application on the terminal that encrypted the first token.

18. The server as described in claim 17, wherein the one or more processors are further configured to decrypt the second token to obtain the first token, to verify whether the first token obtained by decrypting the second token is valid, and to determine that the second token is valid in response to determining that the first token obtained by decrypting the second token is valid.

19. The server as described in claim 16,
wherein the one or more processors are further configured to write the second token into a cookie and to send the cookie to the browser on the terminal.

20. The server as described in claim 19,
wherein the one or more processors are further configured to, in response to receiving a request from the terminal to log into the website via the browser on the terminal, determine whether a cookie of the browser includes the second token, and to determine whether the second token included in the cookie of the browser is valid in response to determining that the cookie of the browser includes the second token.

21. The server as described in claim 20,
wherein the one or more processors are further configured to determine that the terminal is a mobile terminal in response to determining that the second token included in the cookie of the browser is valid.

22. The server as described in claim 16,
wherein the first token is generated further in response to determining that login information received by a server in connection with a login request for accessing the website is correct.

23. The server as described in claim 16,
wherein the one or more processors are further configured to determine whether the server has a first token that is the same as the version of the first token included in the verification request, and
to determine whether the first token is valid if the server is determined to have a the first token that is the same as the version of the first token included in the verification request.

24. The server as described in claim 16, wherein the one or more processors are further configured to permit the terminal to access the website in response to determining that the terminal is a mobile terminal.

25. A computer program product embodied in a tangible non-transitory computer-readable storage medium and comprising computer instructions for:
   receiving, by a website server, a message from a browser on the terminal, wherein the terminal logs into a website associated with the website server via the browser on the terminal, and wherein the message includes screen resolution information of screen resolution for the terminal;
   receiving user agent information of the browser;
   determining an equipment type of the terminal according to the user agent information of the browser;
   determining a screen resolution corresponding to the equipment type of the terminal;
   determining whether the screen resolution corresponding to the equipment type of the terminal is the same as the screen resolution of the terminal that was received from the browser;
   in response to determining that the screen resolution corresponding to the equipment type of the terminal is the same as the screen resolution that was received from the browser, generating a first token;
   sending, by the website server, information including a redirect script to the browser on the terminal, the redirect script configured to cause the terminal to execute the redirect script and to access an activation link to activate a client application on the terminal, wherein a version of the first token is provided to the terminal in connection with the terminal accessing the activation link;
   receiving, by the website server, a verification request from the client application on the terminal, wherein the verification request includes the version of the first token that was acquired by the client application on the terminal using the activation link;
   determining, by the web site server, whether the version of the first token included in the verification request is valid relative to the generated first token;
   in response to determining that the version of the first token included in the verification request is valid, sending, by the website server, an indication that the first token is valid to the client application on the terminal;
   receiving, by the website server, an access request to access the website, the access request including a second token, wherein the second token comprises an encryption of the first token;
   determining, by the website server, whether the second token is valid; and
   determining, by the website server, whether the terminal is a mobile terminal according to whether the second token is valid.

* * * * *